United States Patent [19]
Murai

[11] Patent Number: 5,987,475
[45] Date of Patent: Nov. 16, 1999

[54] APPARATUS AND METHOD FOR PROCESSING HYPERTEXT AND RECORDING MEDIUM

[75] Inventor: Shinya Murai, Tokyo, Japan

[73] Assignee: Kabushiki Kaisha Toshiba, Kanagawa-ken, Japan

[21] Appl. No.: 08/923,003

[22] Filed: Sep. 16, 1997

[30]     Foreign Application Priority Data

Sep. 18, 1996  [JP]  Japan ................................ 8246220

[51] Int. Cl.⁶ ................................................. G06F 17/30
[52] U.S. Cl. ........................................ 707/200; 707/104
[58] Field of Search ........................ 707/10, 200, 104; 395/761

[56]              References Cited

U.S. PATENT DOCUMENTS

| | | | |
|---|---|---|---|
| 5,649,186 | 7/1997 | Ferguson | 395/610 |
| 5,699,331 | 12/1997 | Oshima | 369/32 |
| 5,699,486 | 12/1997 | Tullis et al. | 395/2.79 |
| 5,737,619 | 4/1998 | Judson | 395/761 |
| 5,740,146 | 4/1998 | Webster | 369/107 |

FOREIGN PATENT DOCUMENTS 6-214868   8/1994   Japan.

*Primary Examiner*—Wayne Amsbury
*Assistant Examiner*—Cheryl Lewis
*Attorney, Agent, or Firm*—Finnegan, Henderson, Farabow, Garrett & Dunner, L.L.P.

[57]               ABSTRACT

In a hypertext wherein nodes are constituted by a plurality of files, a displayed node can be copied through a simple operation by providing the steps of accepting a request from a user for a copy of one of the nodes in said hypertext and storing the master file and the slave file that constitute the node for which a request for a copy has been accepted at said the copy request accepting step and storing file relationship information indicating the dependence between the master file and the slave file in addition to the master file when storing the master file.

12 Claims, 11 Drawing Sheets

APPARATUS AND METHOD FOR PROCESSING HYPERTEXT AND RECORDING MEDIUM

FIELD OF THE INVENTION

The present invention relates to an apparatus for copying, displaying, erasing, and selecting a hypertext whose nodes are constituted by a plurality of files.

DESCRIPTION OF THE RELATED ART

A hypertext is constituted by a plurality of units of information referred to as "nodes" and pointers to the nodes referred to as "links" for associating the nodes with each other. A reader of a hypertext can refer to relevant information from one to another by following such links.

A typical system utilizing such a hypertext technique is WWW (world wide web). People can use the WWW to acquire information from worldwide sources easily. In the WWW, one node is often constituted by a plurality of files such as text files and image files.

Meanwhile, portable computers are rapidly spreading as their performance is improved, and this has given rise to mobile computing that allows one to perform information processes such as electronic acquisition, transmission and reference of information wherever he or she goes. In such a mobile computing environment, since a user is not necessarily able to always access servers that store a great amount of information such as WWW servers, the user must copy information which must be referred to frequently into his or her own information device to save it in a memory such as a hard disc.

However, conventional hypertext systems do not have a function of copying a plurality of files included in a displayed node or a node specified by a user at a time. Therefore, when a user wishes to store such files in his or her own portable computer, the user has had to designate files such as text and image files one by one to copy them. This has forced a user to perform complicated operations.

Further, conventional hypertext systems do not have a function of copying all files included in a node specified by a user or files that satisfy conditions specified by a user such as "all image files included in a node" specified by a user at a time. Therefore, copying such files has also required each of the files to be specified separately leading to complicated operations.

Moreover, in the case of an information device whose memory capacity is not sufficiently large such as a portable computer, when a copied node becomes unnecessary after it is displayed and referred to on the information device, a plurality of files included in the displayed node must be erased from the memory. However, conventional hypertext apparatuses do not include a function of erasing nodes that have been saved, and a user has had to select and erase such nodes with a separate tool capable of manipulating files. Such an operation has been complicated for users.

OBJECT OF THE INVENTION

As described above, complicated operations have been required to copy a plurality of files included in a displayed node, to erase a plurality of files included in a displayed node, and to copy a plurality of nodes that satisfy specified conditions.

The present invention has been conceived taking the above-described points into consideration, and it is an object of the present invention to simplify operations of copying a plurality of files included in a displayed node and erasing a plurality of files included in a displayed node and an operation of copying a plurality of files that satisfy predetermined conditions such as "all image files included in a node" specified by a user.

DISCLOSURE OF THE INVENTION

The invention according to Claim 1 is an apparatus for copying a hypertext having a plurality of nodes constituted by one master file and at least one slave file dependent on the master file, characterized in that it comprises:

a copy request accepting means for accepting a request from a user for a copy of one of the nodes in the hypertext; and a copying means for storing the master file and the slave file that constitute the node for which the copy request accepting means has accepted a request for a copy and for storing file relationship information indicating the dependence between the master file and the slave file in addition to the master file when storing the master file.

The invention according to Claim 2 is an apparatus for erasing a hypertext that erases at least one of the nodes of a hypertext copied into the apparatus for copying a hypertext according to Claim 1, characterized in that it comprises:

an erase request accepting means for accepting a request from a user for erasure of one of the nodes of the hypertext;

an erased file retrieving means for retrieving the master file that constitutes the node for which the erase request accepting means has accepted a request for erasure from the apparatus for copying files and for retrieving a slave file based on the file relationship information added to the retrieved master file from the apparatus for copying files; and an erasing means for erasing the master file and slave file retrieved by the erased file retrieving means from the apparatus for copying files.

The invention according to Claim 3 is an apparatus for displaying a hypertext that displays at least one of the nodes of a hypertext copied into the apparatus for copying a hypertext according to Claim 1, characterized in that it comprises:

a display request accepting means for accepting a request from a user for display of one of the nodes of the hypertext;

a displayed file retrieving means for retrieving the master file that constitutes the node for which the display request accepting means has accepted a request for display from the apparatus for copying files and for retrieving a slave file based on the file relationship information added to the retrieved master file from the apparatus for copying files; and a display means for displaying the master file and slave file retrieved by the displayed file retrieving means after forming them into one node based on the file relationship information.

The invention according to Claim 4 is an apparatus for selecting a hypertext that selects at least one node or one file from a hypertext having a plurality of nodes constituted by a plurality of files, characterized in that it comprises:

a memory means for storing, in addition to the file, file identification information identifying the file and attribute information indicating that the file is image information, text information or the like and for storing node identification information identifying the node and file identification information for the files that constitute the node;

a selection request accepting means for accepting a request from a user for selection of a node or file for which predetermined conditions are set; and a selection means for retrieving a node or file that satisfies the conditions for the request for selection accepted by the selection request accepting means based on the file identification information, attribute information or node identification information stored in the memory means and for selecting the node or file that satisfies the conditions from among nodes or files in the memory means.

The invention according to Claim 5 is a method of copying a hypertext for copying at least one node of a hypertext having a plurality of nodes constituted by one master file and at least one slave file dependent on the master file, characterized in that it comprises the steps of:

accepting a request from a user for a copy of one of the nodes in the hypertext; and storing the master file and the slave file that constitute the node for which a request for a copy has been accepted at the copy request accepting step and storing file relationship information indicating the dependence between the master file and the slave file in addition to the master file when storing the master file.

The invention according to Claim 6 is a method of erasing a hypertext for erasing at least one of the nodes of a hypertext copied using the method of copying a hypertext according to Claim 1, characterized in that it comprises the steps of:

accepting a request from a user for erasure of one of the nodes of the hypertext;

retrieving the master file that constitutes the node for which a request for erasure has been accepted at the erase request accepting step and retrieving a slave file based on the file relationship information added to the retrieved master file; and erasing the master file and slave file retrieved at the erased file retrieving step.

The invention according to Claim 7 is a method of displaying a hypertext for displaying at least one of the nodes of a hypertext copied using the method of copying a hypertext according to Claim 1, characterized in that it comprises the steps of:

accepting a request from a user for display of one of the nodes of the hypertext;

retrieving the master file that constitutes the node for which a request for display has been accepted at the display request accepting step and retrieving a slave file based on the file relationship information added to the retrieved master file; and displaying the master file and slave file retrieved at the displayed file retrieving step after forming them into one node based on the file relationship information.

The invention according to Claim 8 is a method of selecting a hypertext for selecting at least one node or one file from a hypertext having a plurality of nodes constituted by a plurality of files, characterized in that it comprises the steps of:

storing, in addition to the file, file identification information identifying the file and attribute information indicating that the file is image information, text information or the like and storing node identification information identifying the node and file identification information for the files that constitute the node;

accepting a request from a user for selection of a node or file for which predetermined conditions are set; and retrieving a node or file that satisfies the conditions for the request for selection at the selection request accepting step based on the file identification information, attribute information or node identification information stored at the storing step and for selecting the node or file that satisfies the conditions from among nodes or files stored at the storing step.

The invention according to Claim 9 is a recording medium for processing a hypertext having a program recorded thereon for copying a hypertext having a plurality of nodes constituted by at least one master file and at least one slave file dependent on the master file, characterized in that it comprises a program recorded thereon for achieving:

a copy request accepting function for accepting a request from a user for a copy of one of the nodes of the hypertext; and a copying function for storing the master file and the slave file that constitute the node for which a request for a copy has been accepted by the copy request accepting function and for storing file relationship information indicating the dependence between the master file and the slave file in addition to the master file when storing the master file.

The invention according to Claim 10 is a recording medium having a program recorded thereon for copying a hypertext having a plurality of nodes constituted by at least one master file and at least one slave file dependent on the master file and for erasing at least one of the nodes in the copied hypertext, characterized in that it comprises a program recorded thereon for achieving:

a copy request accepting function for accepting a request from a user for a copy of one of the nodes of the hypertext;

a copying function for storing the master file and the slave file that constitute the node for which a request for a copy has been accepted by the copy request accepting function and for storing file relationship information indicating the dependence between the master file and the slave file in addition to the master file when storing the master file;

an erase request accepting function for accepting a request from a user for erasure of one of the nodes of the hypertext stored by the copying function;

an erased file retrieving function for retrieving the master file that constitutes the node for which a request for erasure has been accepted by the erase request accepting function from the copying function and for retrieving a slave file based on the file relationship information added to the retrieved master file from the copying function; and an erasing function for erasing the master file and slave file retrieved by the erased file retrieving function from the copying function.

The invention according to Claim 11 is a recording medium having a program recorded thereon for copying a hypertext having a plurality of nodes constituted by at least one master file and at least one slave file dependent on the master file and for displaying at least one of the nodes in the copied hypertext, characterized in that it comprises a program recorded thereon for achieving:

a copy request accepting function for accepting a request from a user for a copy of one of the nodes of the hypertext;

a copying function for storing the master file and the slave file that constitute the node for which a request for a copy has been accepted by the copy request accepting function and for storing file relationship information indicating the dependence between the master file and the slave file in addition to the master file when storing the master file;

a display request accepting function for accepting a request from a user for display of one of the nodes of the hypertext stored by the copying function;

a displayed file retrieving function for retrieving the master file that constitutes the node for which a request for display has been accepted by the display request accepting function from the copying function and for retrieving a slave file based on the file relationship information added to the retrieved master file from the copying function; and a display function for displaying the master file and slave file retrieved by the displayed file retrieving function after forming them into one node based on the file relationship information.

The invention according to Claim 12 is a recording medium having a program recorded thereon for selecting at least one node or one file from a hypertext having a plurality of nodes constituted by a plurality of files, characterized in that it comprises a program for achieving:

a memory function for storing, in addition to a file, file identification information identifying the file and attribute information indicating that the file is image information, text information or the like and for storing node identification information identifying the node and file identification information for the files that constitute the node;

a selection request accepting function for accepting a request from a user for selection of a node or file for which predetermined conditions are set; and a selection function for retrieving a node or file that satisfies the conditions for the request for selection accepted by the selection request accepting function based on the file identification information, attribute information or node identification information stored by the memory function and for selecting the node or file that satisfies the conditions from among nodes or files in the memory function.

The invention according to Claim 1, 5 or 9 makes it possible to copy a plurality of files included in one node in a hypertext through a simple operation.

The invention according to Claim 2, 6 or 10 makes it possible to erase a plurality of files included in one node of a hypertext from an apparatus for copying a hypertext through a simple operation.

The invention according to Claim 3, 7 or 11 makes it possible to display one node stored in an apparatus for copying a hypertext through a simple operation.

The invention according to Claim 4, 8 or 12 makes it possible to select a plurality of files that satisfy predetermined conditions such as all files included in nodes specified by a user or all image files included in nodes specified by a user through a simple operation.

BEST MODE FOR CARRYING OUT THE INVENTION

First Embodiment

A method of copying a hypertext according to a first embodiment of the present invention will now be described with reference to FIGS. 1, 2, 3 and 4.

Figure 1:
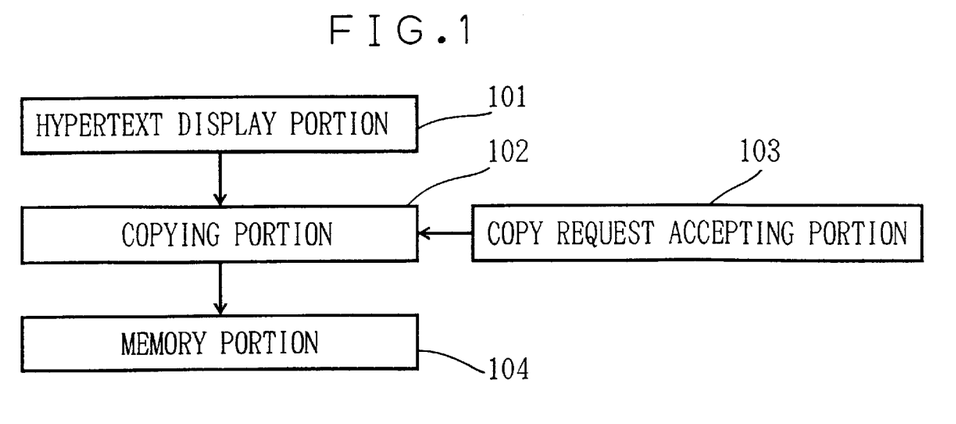
FIG. 1 is a functional block diagram showing a first embodiment of the present invention.

FIG. 1 is a functional block diagram showing the present embodiment.

This system includes a hypertext display portion 101, a copying portion 102, a copy request accepting portion 103, and a memory portion 104.

The hypertext display portion 101 displays nodes acquired from other information devices through a network and nodes stored in a memory on a display, a window, or the like.

A node is constituted by information stored in a plurality of files. Files that constitute a node always include one master file which contains node identification information for identifying the node and file relationship information that is information indicating the relationship between information stored in the files constituting the node such as positions where each piece of information is displayed.

For example, the copy request accepting portion 103 represents a button or menu for accepting a request for a copy from a user.

Upon receipt of a request for a copy from a user, the copying portion 102 copies the files included in a displayed node with original file identification information, i.e., information for identifying the original files added thereto and requests the memory portion 104 to store the copied files.

The memory portion 104 manages external memories such as a hard disc and performs operations such as storing and erasing files that constitute a hypertext.

Figure 2:
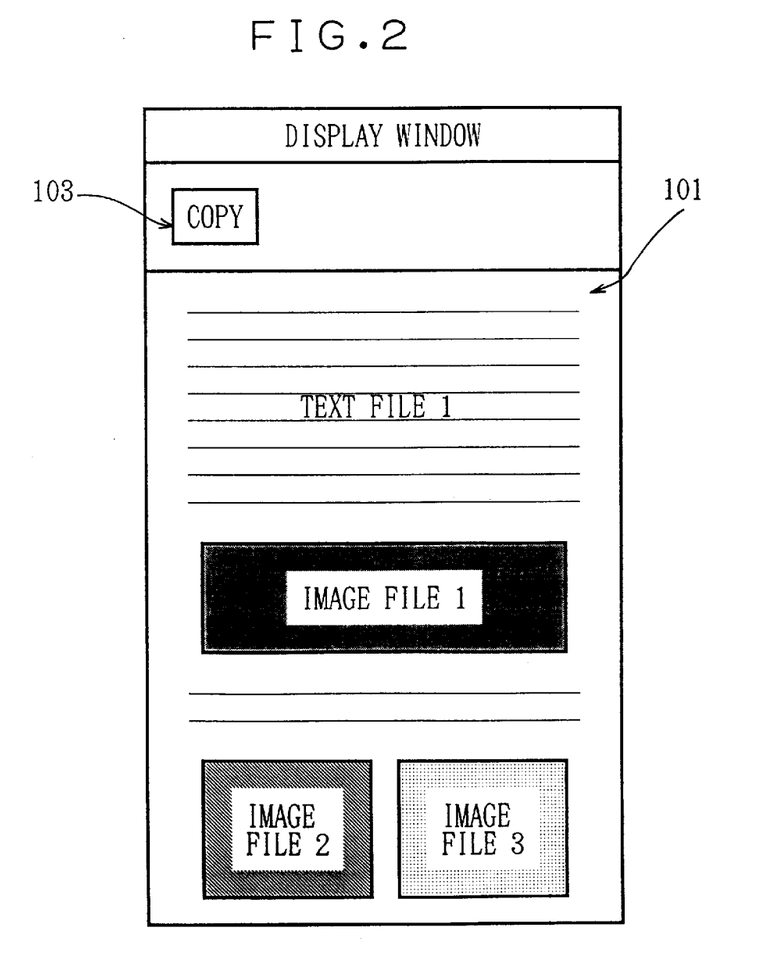
FIG. 2 illustrates a display screen according to the first embodiment of the present invention.

FIG. 2 is an illustration of a display screen according to the present embodiment.

The copy request accepting portion 103 may be provided on a window as shown in FIG. 2 where the hypertext display portion 101 displays a node or on a different window.

Figure 3:
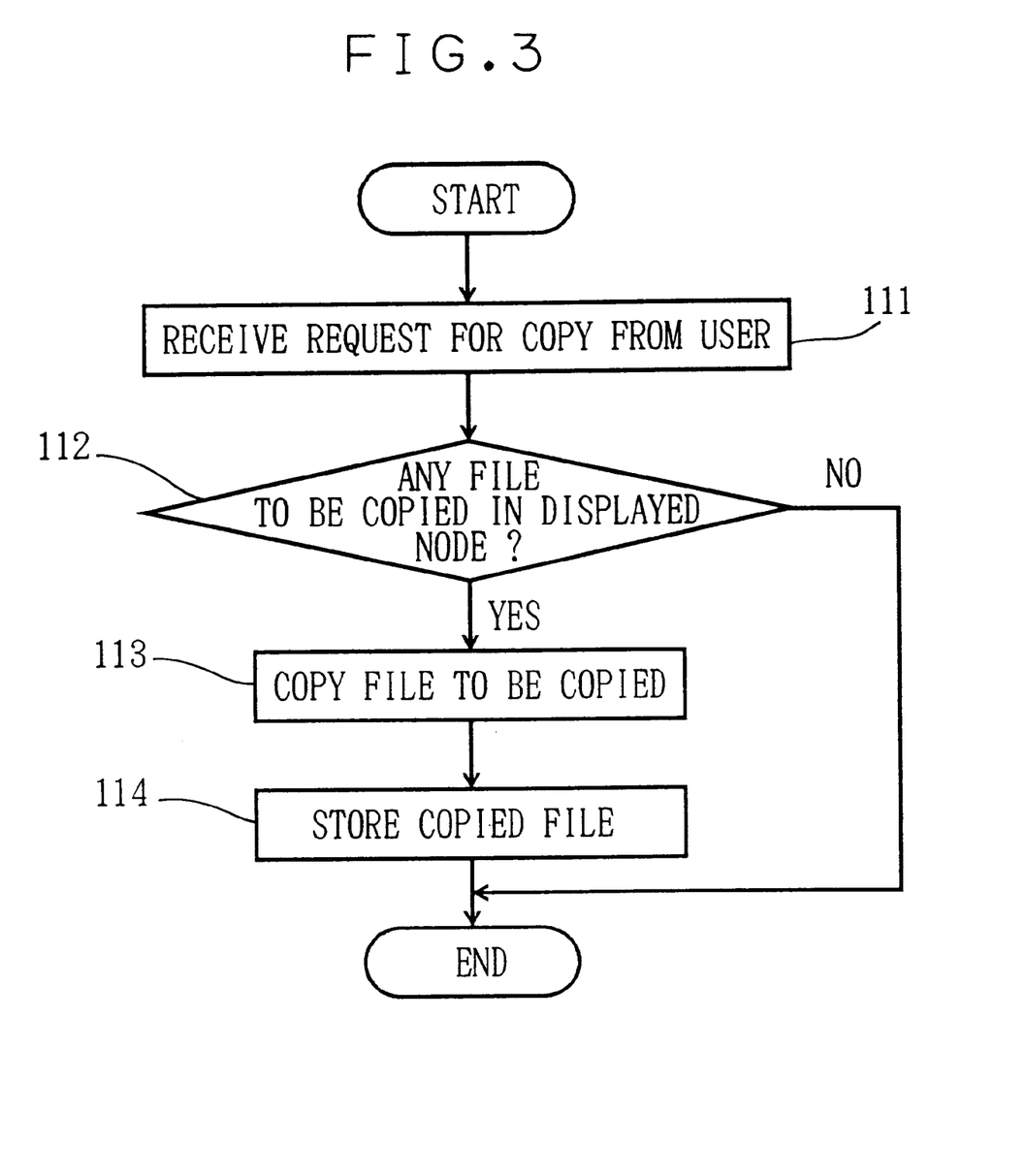
FIG. 3 is a flow chart showing a node copying procedure for according to the first embodiment of the present invention.

FIG. 3 shows an example of a node copying procedure according to the first embodiment.

One node is constituted by one master file and one or more slave files such as image files and text files pasted on the master file.

Definitions are now given for terms used in the following description.

The term "node identification information" means information for identifying one node out of a plurality of nodes. Therefore, a master file can be acquired by specifying the node identification information.

The term "file relationship information" means information indicating the relationship between a master file and each of slave files.

The term "slave file identification information" means information for identifying one slave file out of a plurality of slave files.

First, the copy request accepting portion 103 receives a request for a copy from a user at step 111.

Next, at step 112, the copying portion 102 checks whether displayed nodes include any file to be copied. For example, this may be carried out by checking the files included in the nodes displayed by the hypertext display portion 101 when nodes are displayed or when a request for a copy is received from the user and by comparing the files with the files stored in the memory portion 104.

If step 112 reveals that there is no file to be copied, the process is terminated. For example, this occurs when the user issues a second request for a copy for any file that has already been copied.

If step 112 indicates that there is file(s) to be copied, the process proceeds to step 113.

At step 113, the copying portion 102 copies all of the master files and slave files to be copied. At this time, file relationship information and slave file identification information is added to the master files and the slave files, respectively. The memory portion 104 is requested to store those copied files.

At step 114, the memory portion 104 stores the files in a memory as requested by the copying portion 102, and the process is terminated.

Thus, a user can easily copy all files in a node in a mode that allows them to be reconstructed as a node by simply operating a button or the like to issue a request for a copy.

Figure 4:
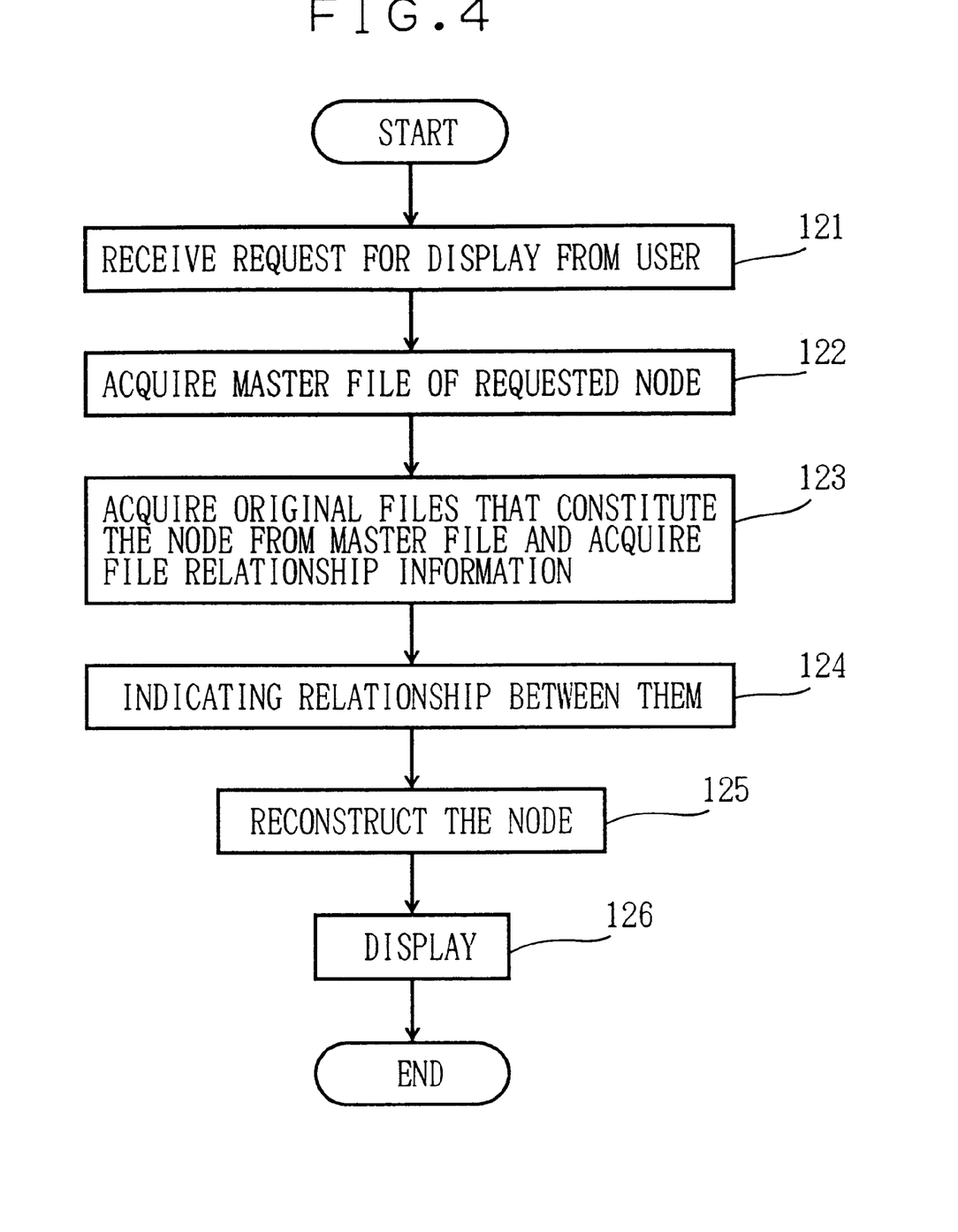
FIG. 4 is a flow chart showing a node reconstructing procedure according to the first embodiment of the present invention.

FIG. 4 shows a procedure for reconstructing a node from a plurality of files which have been copied according to the present invention.

At step 121, a request for display of a node is received from a user.

At step 122, the master file of the node requested by the user is acquired by referring to the node identification information associated with each of the master files among the copied files.

Step 123 obtains the slave files which constitute the node included in the master file obtained at step 122 and obtains the file relationship information which indicates the relationship between the master file and the slave files.

Step 124 obtains copied files that constitute a node based on the file relationship information and the slave file identification information included in each slave file.

At step 125, the node requested by the user is reconstructed from the copied files obtained at step 124 using the file relationship information.

Figure 14:
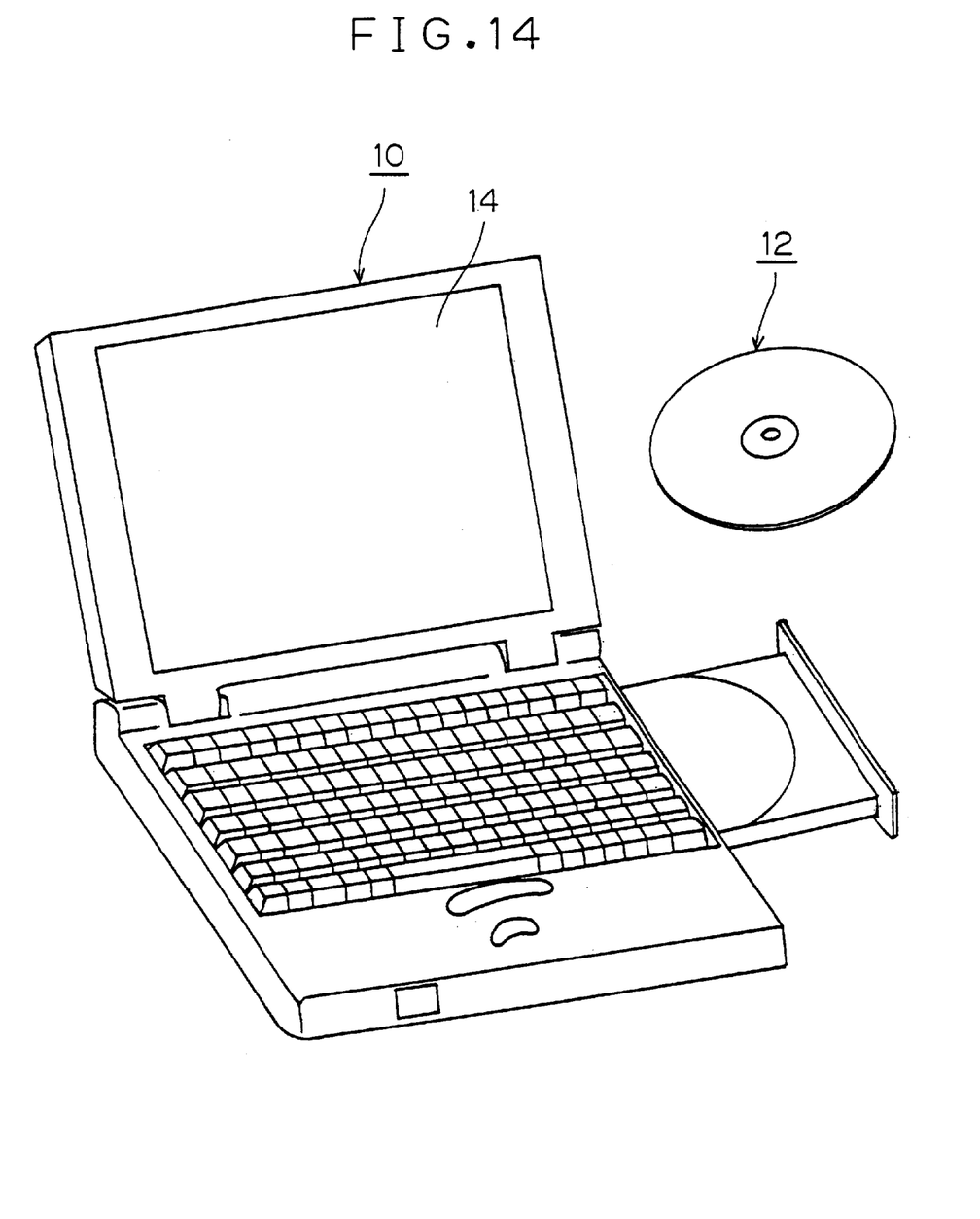
FIG. 14 is a perspective view of a portable computer which embodies the present invention.

Although the above description has referred to a case wherein the present embodiment is implemented on a hardware basis, the present embodiment may be implemented so as to achieve the process shown in FIGS. 3 and 4 by configuring the functions of the copying portion 102 and the copy request accepting portion 103 using software which is stored in a CD-ROM 12 as shown in FIG. 14 to thereby store it in a portable computer 10. In this case, the hypertext display portion 101 corresponds to a display portion 14 of the portable computer 10. The memory portion 104 corresponds to a hard disc device of the portable computer 10. Thus, the present embodiment may be implemented with the portable computer 10.

Second Embodiment

A method of erasing a hypertext according to a second embodiment of the present invention will now be described with reference to FIGS. 5, 6 and 7.

Figure 5:
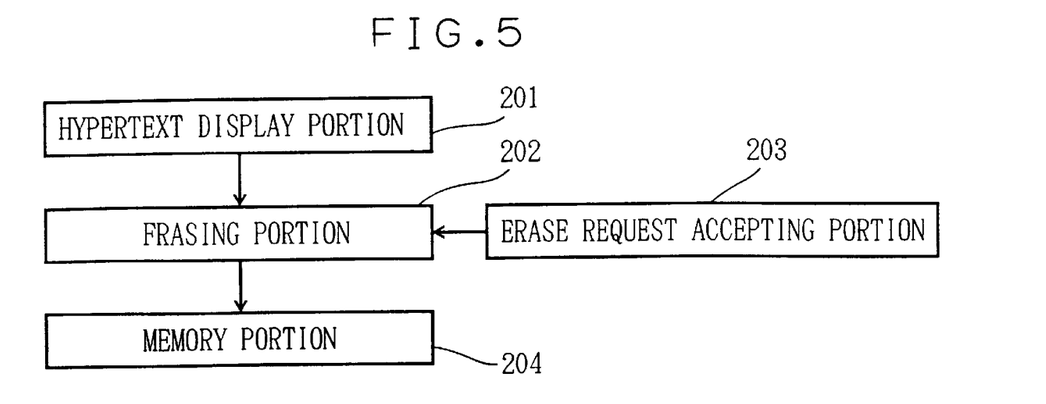
FIG. 5 is a functional block diagram showing a second embodiment of the present invention.

FIG. 5 is a functional block diagram showing the second embodiment of the invention.

This system includes a hypertext display portion 201, an erasing portion 202, an erase request accepting portion 203, and a memory portion 204. The hypertext display portion 201 and memory portion 204 have the same function as those in the first embodiment. For example, the erase request accepting portion 203 represents a button or menu for accepting a request for erasure from a user.

Upon receipt of a request for erasure from a user, the erasing portion 202 requests the memory portion 204 to erase the files included in a displayed node.

Figure 6:
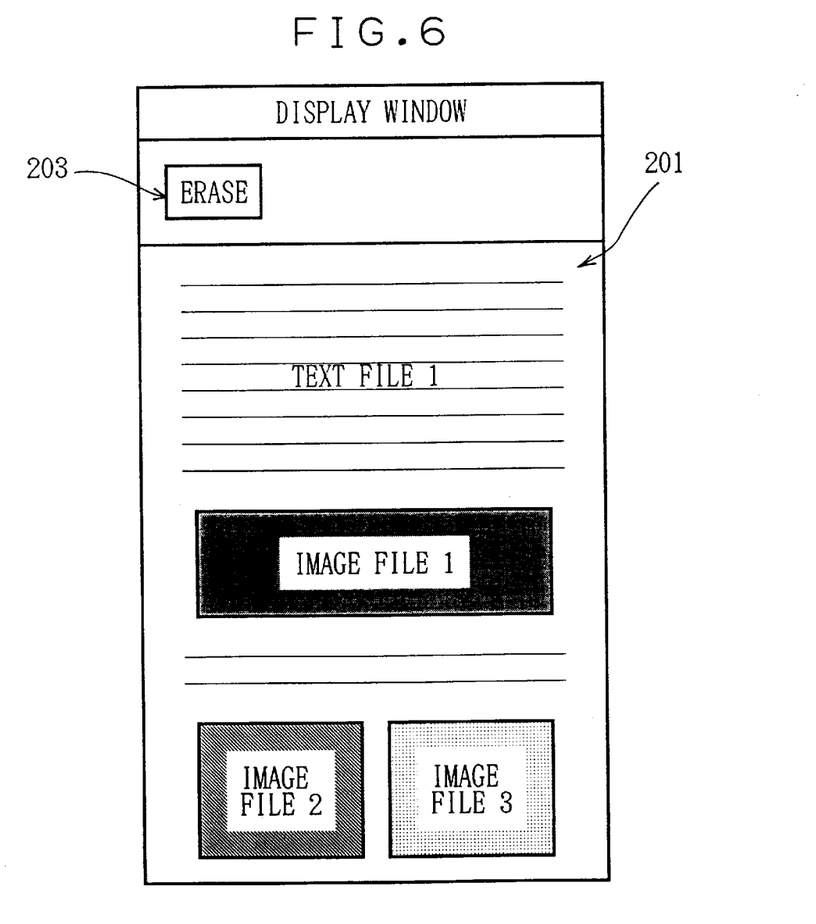
FIG. 6 illustrates a display screen according to the second embodiment of the present invention.

FIG. 6 is an illustration of a display screen according to the present embodiment.

The copy request accepting portion 203 may be provided on a window as shown in FIG. 6 where the hypertext display portion 201 displays a node or on a different window.

Figure 7:
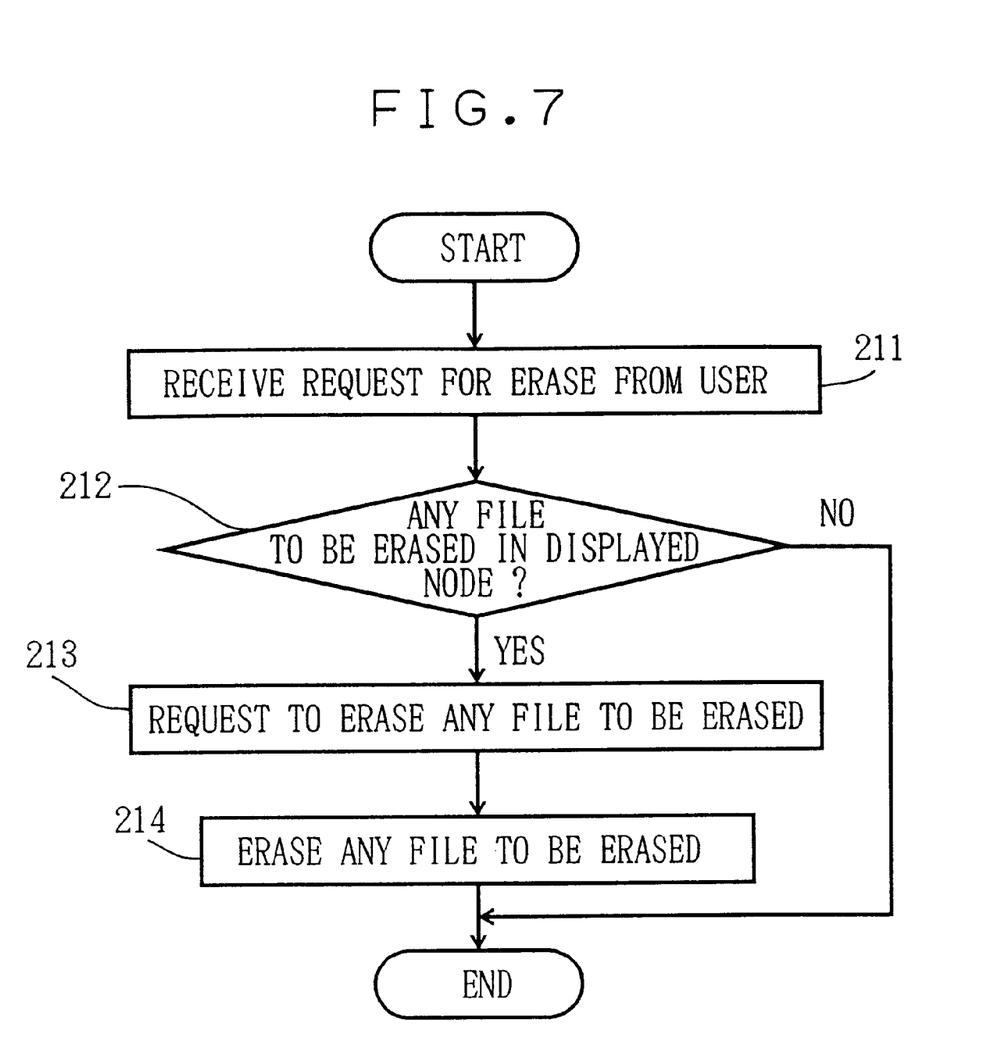
FIG. 7 is a flow chart showing a node copying procedure according to the second embodiment of the present invention.

FIG. 7 shows an example of an erasing procedure according to the second embodiment.

At step 211, the erase request accepting portion 203 receives a request for erasure from a user.

At step 212, the erasing portion 202 checks whether displayed nodes include any file to be erased. For example, this may be carried out by checking the files included in the nodes displayed by the hypertext display portion 201 when nodes are displayed or when a request for erasure is received from the user and by comparing the files with the files stored in a memory.

If step 212 reveals that there is no file to be erased, the process is terminated. For example, this occurs when the user issues a second request for erasure of any file that has already been erased.

If step 212 indicates that there is file(s) to be erased, the process proceeds to step 213.

At step 213, the erasing portion 202 requests the memory portion 204 to erase all of the files to be erased. For example, when there is a request for erasure of one node; a master file is selected from the node identification information associated therewith; each slave file is selected from the file relationship information added to the master file; and the memory portion 204 is notified of the slave file identification information and node identification information associated therewith.

At step 214, the memory portion 204 erases the files in a memory based on the slave file identification information and node identification information notified by the erasing portion 202, and the process is terminated.

Thus, a user can easily erase all files in a node by simply operating a button or the like to issue a request for erasure.

Although the above description has referred to a case wherein the present embodiment is implemented on a hardware basis, the present embodiment may be implemented so as to achieve the process shown in FIG. 7 by configuring the functions of the erasing portion 202 and the erase request accepting portion 203 using software which is stored in the CD-ROM 12 as shown in FIG. 14 to thereby store it in the portable computer 10. In this case, the hypertext display portion 101 corresponds to the display portion 14 of the portable computer 10. The memory portion 204 corresponds to the hard disc device of the portable computer 10. Thus, the present embodiment may be implemented with the portable computer 10.

Third Embodiment

A method of copying and erasing a hypertext according to a third embodiment of the present invention will now be described with reference to FIG. 8.

Figure 8:
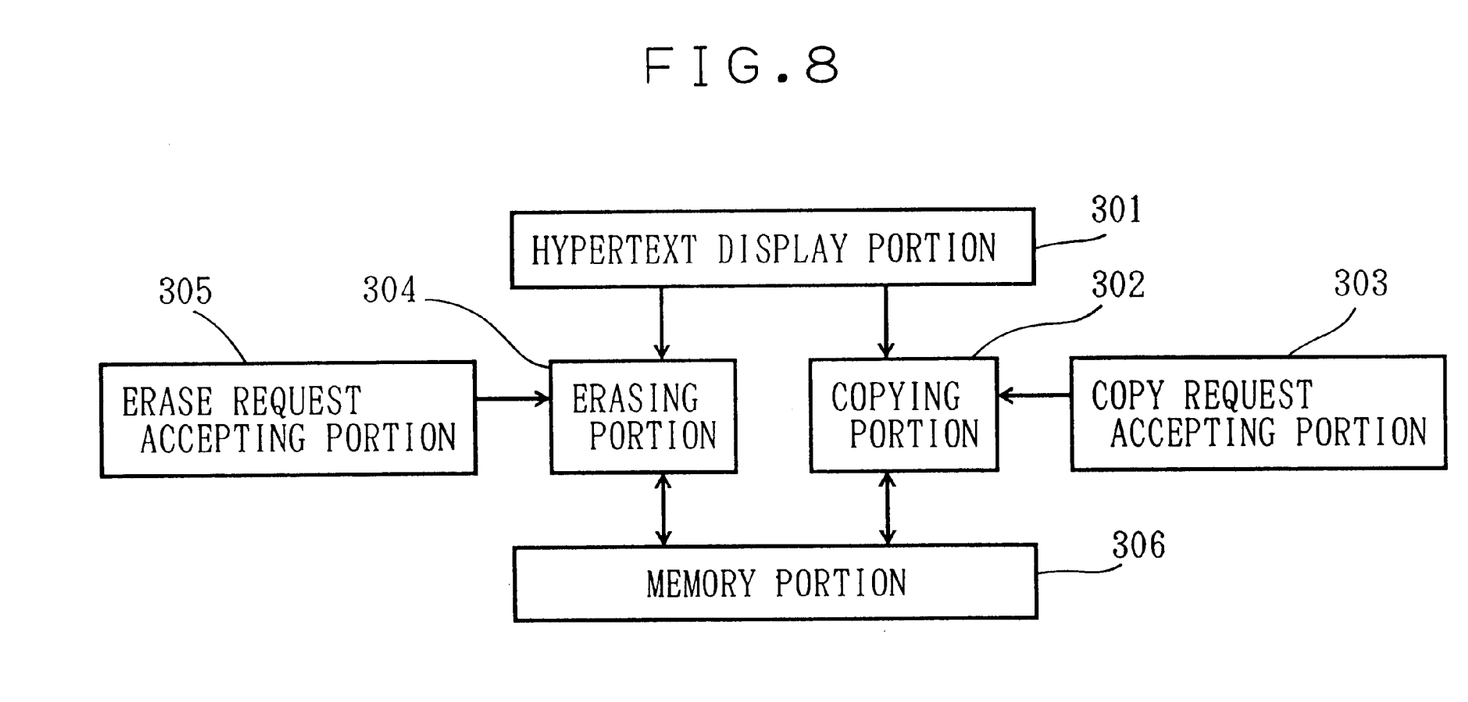
FIG. 8 is a functional block diagram showing a third embodiment of the present invention.

FIG. 8 is a functional block diagram showing the third embodiment of the invention.

This system includes the functional blocks of both of the first and second embodiments. Thus, a user can easily copy all files in a node by simply operating a button or the like to issue a request and can easily erase any node which has become unnecessary or which has been copied by mistake among the copied nodes by simply operating a button or the like to issue a request.

Although the above description has referred to a case wherein the present embodiment is implemented on a hardware basis, the present embodiment may be implemented so as to achieve the process shown in FIG. 7 by configuring the functions of the erasing portion 102 and the erase request accepting portion 103 using software which is stored in the CD-ROM 12 as shown in FIG. 14 to thereby store it in the portable computer 10. In this case, the hypertext display portion 101 corresponds to the display portion 14 of the portable computer 10. Thus, the present embodiment may be implemented with the portable computer 10.

Fourth Embodiment

A method of copying a hypertext according to a fourth embodiment of the present invention will now be described with reference to FIGS. 9, 10, 11, 12 and 13.

Figure 9:
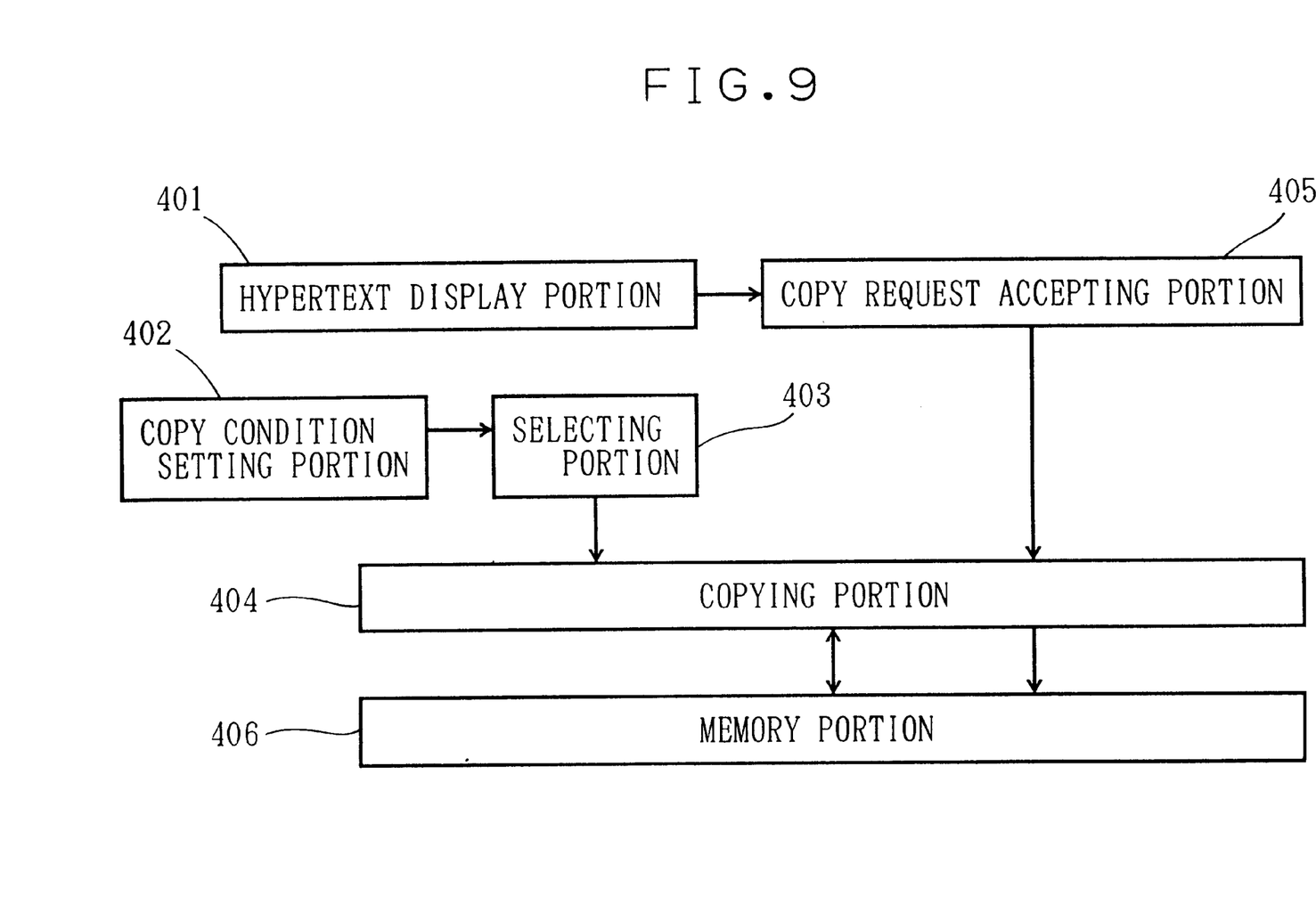
FIG. 9 is a functional block diagram showing a fourth embodiment of the present invention.

FIG. 9 is a functional block diagram showing the fourth embodiment of the invention.

This system includes a hypertext display portion 401, a copy condition setting portion 402, a selecting portion 403, a copying portion 404, a copy request accepting portion 405, and a memory portion 406.

The hypertext display portion 401, copy request accepting portion 405, and memory portion 406 have the same functions as those in the first embodiment.

For example, the copy condition setting portion 402 sets copying conditions such as "all files included in a node" specified by a user or "all image files included in a node" specified by a user.

The selecting portion 403 selects the node or file that satisfy the conditions set by the copy condition setting portion 402 from a memory associated therewith or any other memory connected thereto through a network.

The copying portion 404 requests the memory portion 406 to copy the file selected by the selecting portion 403.

Figure 10:
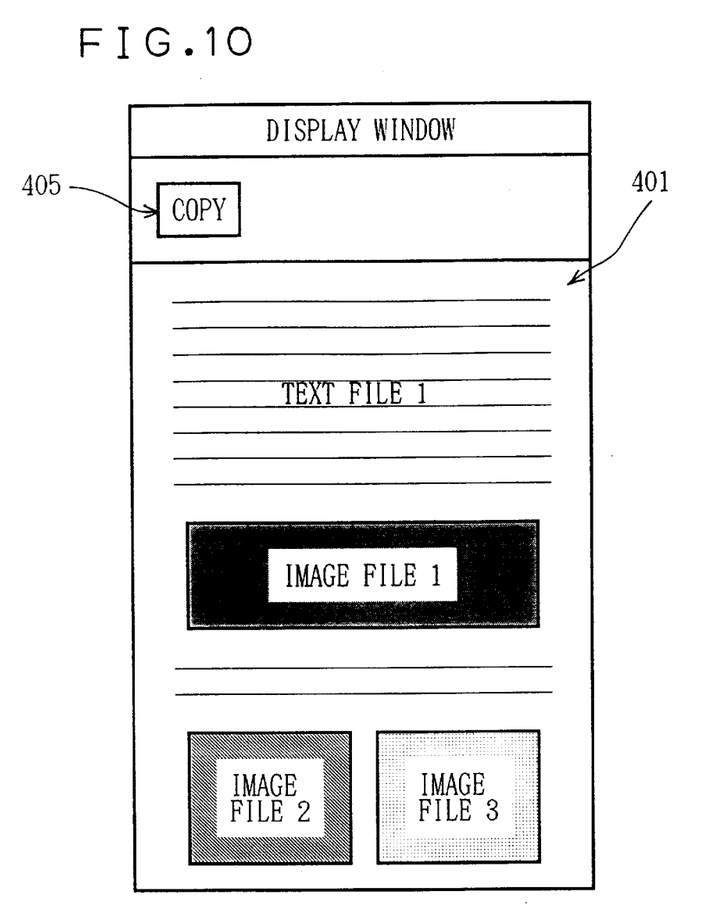
FIG. 10 illustrates a display screen according to the fourth embodiment of the present invention.

FIG. 10 is an illustration of a display screen according to the present embodiment.

The copy request accepting portion 405 may be provided on a window as shown in FIG. 10 where the hypertext display portion 401 displays a node or on a different window.

Figure 11:
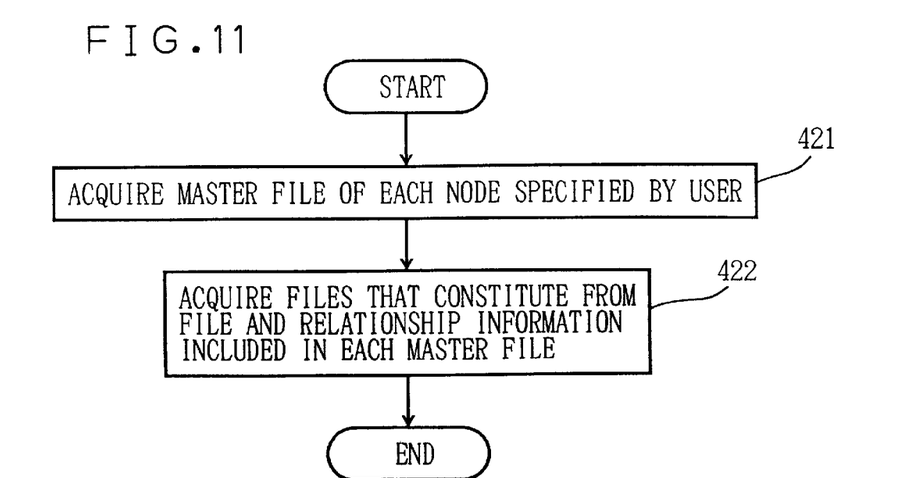
FIG. 11 is a flow chart showing a file selecting procedure according to the fourth embodiment of the present invention.

A description will now be made with reference to FIG. 11 on the operation of the selecting portion 403 in the case wherein a condition is set at the copy condition setting portion 402 such that all files in a plurality of nodes specified by a user are to be copied.

At step 421, the selecting portion 403 acquires the master file of each of the nodes specified by the user from a memory associated therewith or any other memory connected thereto through a network.

At step 422, the selecting portion 403 selects all files that constitute each of the nodes specified by the user using the file relationship information included in each of the master files thus acquired.

Further, a description will now be made with reference to FIG. 11 on the operation of the selecting portion 403 in the case wherein a condition is set at the copy condition setting portion 402 such that all image files in nodes specified by a user are to be copied.

Figure 12:
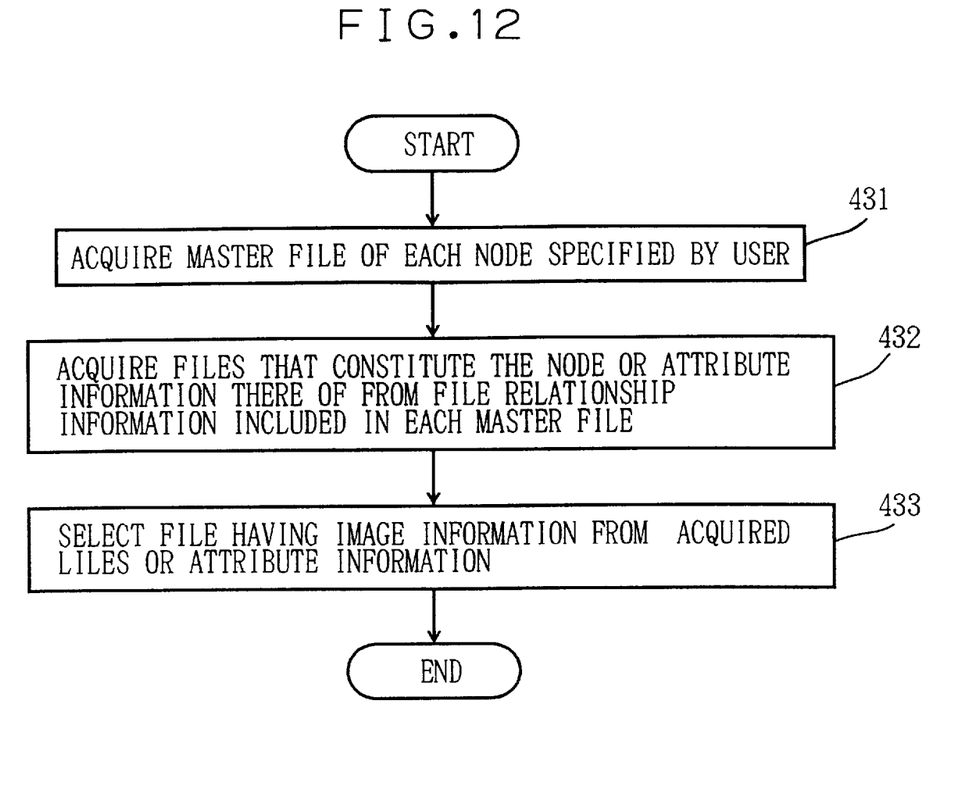
FIG. 12 is a flow chart showing a file selecting procedure according to the fourth embodiment of the present invention.

At step 431, the selecting portion 403 acquires the master file of each of the nodes specified by the user from a memory associated therewith or any other memory connected thereto through a network.

At step 432, the selecting portion 403 selects files that constitute the nodes or attribute information of the files using the file relationship information included in each of the master files thus acquired.

At step 433, the selecting portion 403 selects the image files included in each of the nodes specified by the user by analyzing the file attribute information thus obtained and information stored in the files.

Figure 13:
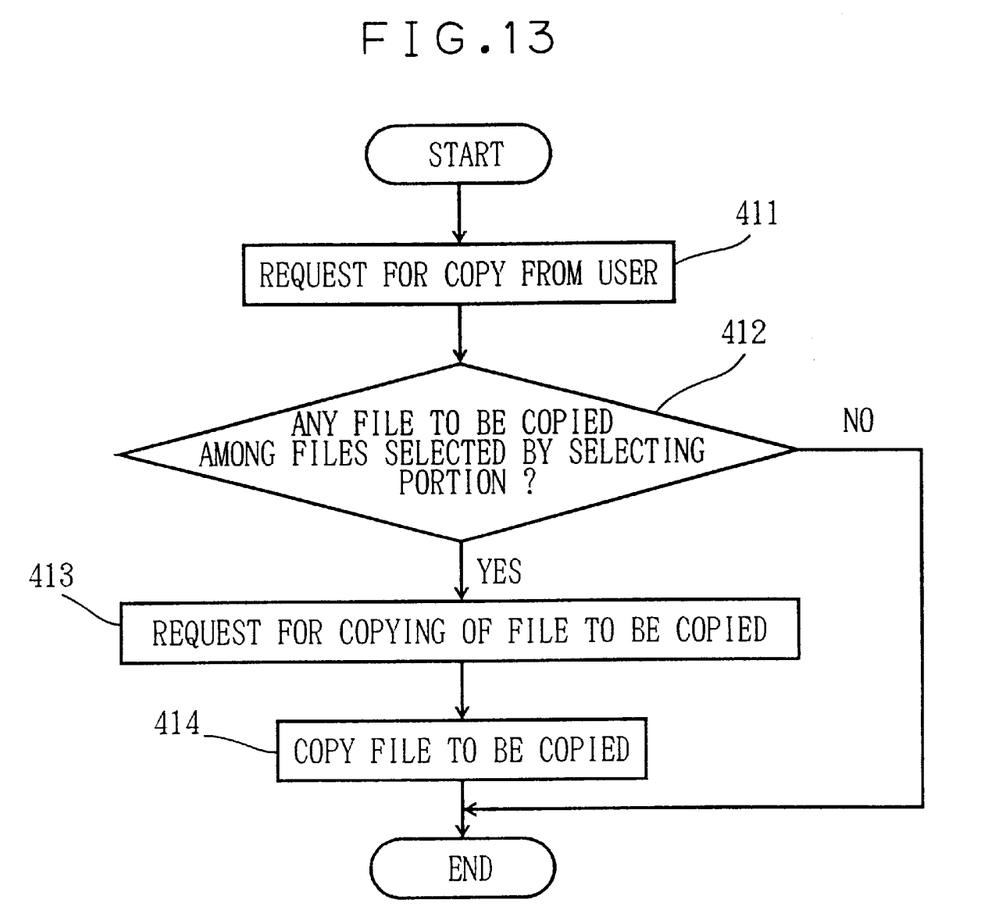
FIG. 13 is a flow chart showing a node copying procedure according to the fourth embodiment of the present invention.

FIG. 13 shows a node copying procedure according to the fourth embodiment of the invention.

At step 411, the copy request accepting portion 405 receives a request for a copy from a user. At step 412, the copying portion 404 checks whether any file to be copied is present among the files selected by the selecting portion 403 that satisfy the condition set at the copy condition setting portion 402. For example, this may be carried out by comparing the files selected by the selecting portion 403 with the files stored in the memory portion 406.

If step 412 reveals that there is no file to be copied, the process is terminated. For example, this occurs when the user issues a second request for a copy of any file that has already been copied.

If step 412 indicates that there is file(s) to be copied, the process proceeds to step 413. At step 413, the copying portion 404 requests the memory portion 406 to copy all of the files to be copied.

At step 414, the memory portion 406 copies the files requested by the copying portion 404, and the process is terminated.

Thus, a user can easily copy for example, all files in a plurality of nodes specified by a user or all image files included in the files in nodes specified by a user through a simple operation.

Although the above description has referred to a case wherein the present embodiment is implemented on a hardware basis, the present embodiment may be implemented so as to achieve the process shown in FIG. 7 by configuring the functions of the copy condition setting portion 402, selecting portion 403, copy request accepting portion 405, and copying portion 404 using software which is stored in the CD-ROM 12 as shown in FIG. 14 to thereby store it in the portable computer 10. In this case, the hypertext display portion 401 corresponds to the display portion 14 of the portable computer 10. The memory portion 406 corresponds to the hard disc device of the portable computer 10. Thus, the present embodiment may be implemented with the portable computer 10.

INDUSTRIAL APPLICABILITY

As described above, the present invention makes it possible to copy a plurality of files included in one node in a hypertext through a simple operation.

Further, the present invention makes it possible to erase a plurality of files included in one node of a hypertext from an apparatus for copying a hypertext through a simple operation.

Further, the present invention makes it possible to display one node stored in an apparatus for copying a hypertext through a simple operation.

Furthermore, the present invention makes it possible to select a plurality of files that satisfy predetermined conditions such as all files included in nodes specified by a user or all image files included in nodes specified by a user through a simple operation.

I claim:

1. An apparatus for processing a hypertext that copies a hypertext having a plurality of nodes constituted by one master file and at least one slave file dependent on the master file, comprising:

a copy request accepting means for accepting a request from a user for a copy of one of the nodes in said hypertext; and a means for copying and storing the master file and the slave file that constitute the node for which said copy request accepting means has accepted a request for a copy, and for storing file relationship information indicating the dependence between the master file and the slave file, and the master file identification information when storing the master file.

2. An apparatus for processing a hypertext that copies a hypertext having a plurality of nodes constituted by one master file and at least one slave file dependent on the master file and erases at least one of the nodes of the copied hypertext, characterized in that it comprises:

a copy request accepting means for accepting a request from a user for a copy of one of the nodes in said hypertext;

a copying means for storing the master file and the slave file that constitute the node for which said copy request accepting means has accepted a request for a copy and for storing file relationship information indicating the dependence between the master file and the slave file in addition to the master file when storing the master file;

an erase request accepting means for accepting a request from a user for erasure of one of the nodes of the hypertext stored in said copy means;

an erased file retrieving means for retrieving the master file that constitutes the node for which said erase request accepting means has accepted a request for erasure from said copy means and for retrieving a slave file based on the file relationship information added to the retrieved master file from said copy means; and an erasing means for erasing the master file and slave file retrieved by said erased file retrieving means from said copy means.

3. An apparatus for processing a hypertext that copies a hypertext having a plurality of nodes constituted by one master file and at least one slave file dependent on the master file and displays at least one of the nodes of the copied hypertext, characterized in that it comprises:

a copy request accepting means for accepting a request from a user for a copy of one of the nodes in said hypertext;

a copying means for storing the master file and the slave file that constitute the node for which said copy request accepting means has accepted a request for a copy and for storing file relationship information indicating the dependence between the master file and the slave file in addition to the master file when storing the master file;

a display request accepting means for accepting a request from a user for display of one of the nodes of the hypertext stored in said copy means;

a displayed file retrieving means for retrieving the master file that constitutes the node for which said display request accepting means has accepted a request for display from said copy means and for retrieving a slave file based on the file relationship information added to the retrieved master file from said copy means; and a display means for displaying the master file and slave file retrieved by said displayed file retrieving means after forming them into one node based on said file relationship information.

4. An apparatus for processing a hypertext that selects at least one node or one file from a hypertext having a plurality of nodes constituted by a plurality of files, comprising:

a memory means for storing, in addition to the file, file identification information identifying said file and attribute information indicating that the file is image information, text information or the like and for storing node identification information identifying said node and file identification information for the files that constitute the node;

a selection request accepting means for accepting a request from a user for selection of a node or file for which predetermined conditions are set; and a selection means for retrieving a node or file that satisfies the conditions for the request for selection accepted by said selection request accepting means based on the file identification information, attribute information or node identification information stored in said memory means and for selecting the node or file that satisfies the conditions from among nodes or files in said memory means.

5. A method of processing a hypertext for copying at least one node of a hypertext having a plurality of nodes constituted by one master file and at least one slave file dependent on the master file, comprising the steps of:

accepting a request from a user for a copy of one of the nodes in said hypertext; and storing the master file and the slave file that constitute the node for which a request for a copy has been accepted at said copy request accepting step, and storing file relationship information indicating the dependence between the master file and the slave file, and the master file identification information when storing the master file.

6. A method of processing a hypertext for copying at least one node of a hypertext having a plurality of nodes constituted by one master file and at least one slave file dependent on the master file and for erasing at least one of the nodes of the copied hypertext, comprising the steps of:

accepting a request from a user for a copy of one of the nodes in said hypertext;

storing the master file and the slave file that constitute the node for which a request for a copy has been accepted at said copy request accepting step, and storing file relationship information indicating the dependence between the master file and the slave file in addition to the master file identification information when storing the master file;

accepting a request from a user for erasure of one of the nodes of said hypertext;

retrieving the stored master file that constitutes the node for which a request for erasure has been accepted at said erase request accepting step and retrieving said stored dependent slave file based on the file relationship information added to the retrieved master file; and erasing the master file and slave file retrieved at said erased file retrieving step.

7. A method of processing a hypertext for copying at least one node of a hypertext having a plurality of nodes constituted by one master file and at least one slave file dependent on the master file and displaying at least one of the nodes of the copied hypertext, comprising the steps of:

accepting a request from a user for a copy of one of the nodes in said hypertext;

storing the master file and the slave file that constitute the node for which a request for a copy has been accepted at said copy request accepting step and storing file relationship information indicating the dependence between the master file and the slave file in addition to the master file identification information when storing the master file;

accepting a request from a user for display of one of the nodes of said hypertext;

retrieving the stored master file that constitutes the node for which a request for display has been accepted at said display request accepting step and retrieving the stored dependent slave file based on the file relationship information added to the retrieved master file; and     displaying the master file and slave file retrieved at said displayed file retrieving step after forming them into one node based on said file relationship information.

8. A method of processing a hypertext for selecting at least one node or one file from a hypertext having a plurality of nodes constituted by a plurality of files, comprising the steps of:

storing, in addition to the file, file identification information identifying said file and attribute information indicating that the file is image information, text information or the like, and storing node identification information identifying said node and file identification information for the files that constitute the node;

accepting a request from a user for selection of a node or file for which predetermined conditions are set; and     selecting and retrieving a node or file that satisfies the conditions for the request for selection at said selection request accepting step based on the file identification information, attribute information or node identification information stored at said storing step.

9. A recording medium for processing a hypertext having a program recorded thereon for copying a hypertext having a plurality of nodes constituted by at least one master file and at least one slave file dependent on the master file, characterized in that it comprises a program recorded thereon for achieving:

a copy request accepting function for accepting a request from a user for a copy of one of the nodes of said hypertext; and     a copying function for storing the master file and the slave file that constitute the node for which a request for a copy has been accepted by said copy request accepting function and for storing file relationship information indicating the dependence between the master file and the slave file in addition to the master file identification information when storing the master file.

10. A recording medium for processing a hypertext having a program recorded thereon for copying a hypertext having a plurality of nodes constituted by at least one master file and at least one slave file dependent on the master file and for erasing at least one of the nodes in the copied hypertext, characterized in that it comprises a program recorded thereon for achieving:

a copy request accepting function for accepting a request from a user for a copy of one of the nodes of said hypertext;

a copying function for storing the master file and the slave file that constitute the node for which a request for a copy has been accepted by said copy request accepting function and for storing file relationship information indicating the dependence between the master file and the slave file in addition to the master file when storing the master file;

an erase request accepting function for accepting a request from a user for erasure of one of the nodes of the hypertext stored by said copying function;

an erased file retrieving function for retrieving the master file that constitutes the node for which a request for erasure has been accepted by said erase request accepting function from said copying function and for retrieving a slave file based on the file relationship information added to the retrieved master file from said copying function; and     an erasing function for erasing the master file and slave file retrieved by said erased file retrieving function from said copying function.

11. A recording medium for processing a hypertext having a program recorded thereon for copying a hypertext having a plurality of nodes constituted by at least one master file and at least one slave file dependent on the master file and for displaying at least one of the nodes in the copied hypertext, characterized in that it comprises a program recorded thereon for achieving:

a copy request accepting function for accepting a request from a user for a copy of one of the nodes of said hypertext;

a copying function for storing the master file and the slave file that constitute the node for which a request for a copy has been accepted by said copy request accepting function and for storing file relationship information indicating the dependence between the master file and the slave file in addition to the master file when storing the master file;

a display request accepting function for accepting a request from a user for display of one of the nodes of the hypertext stored by said copying function;

a displayed file retrieving function for retrieving the master file that constitutes the node for which a request for display has been accepted by said display request accepting function from said copying function and for retrieving a slave file based on the file relationship information added to the retrieved master file from said copying function; and     a display function for displaying the master file and slave file retrieved by said displayed file retrieving function after forming them into one node based on said file relationship information.

12. A recording medium for processing a hypertext having a program recorded thereon for selecting at least one node or one file from a hypertext having a plurality of nodes constituted by a plurality of files, characterized in that it comprises a program for achieving:

a memory function for storing, in addition to a file, file identification information identifying said file and attribute information indicating that the file is image information, text information or the like and for storing node identification information identifying said node and file identification information for the files that constitute the node;

a selection request accepting function for accepting a request from a user for selection of a node or file for which predetermined conditions are set; and a selection function for retrieving a node or file that satisfies the conditions for the request for selection accepted by said selection request accepting function based on the file identification information, attribute information or node identification information stored by said memory function and for selecting the node or file that satisfies the conditions from among nodes or files in said memory function.

* * * * *